United States Patent
Doetsch et al.

(10) Patent No.: US 7,095,792 B2
(45) Date of Patent: Aug. 22, 2006

(54) METHOD AND DEVICE FOR GENERATING A RATE COMPATIBLE CODE

(75) Inventors: Markus Doetsch, Schliern (CH); Tideya Kella, München (DE); Peter Schmidt, Erpolzheim (DE); Peter Jung, Otterberg (DE); Jörg Plechinger, München (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 593 days.

(21) Appl. No.: 10/059,540

(22) Filed: Jan. 29, 2002

(65) Prior Publication Data

US 2002/0114402 A1 Aug. 22, 2002

Related U.S. Application Data

(63) Continuation of application No. PCT/DE00/02302, filed on Jul. 14, 2000.

(30) Foreign Application Priority Data

Jul. 29, 1999 (DE) ................. 199 35 785

(51) Int. Cl.
*H04L 5/12* (2006.01)
(52) U.S. Cl. ................. 375/265; 714/790
(58) Field of Classification Search ............ 375/262, 375/265, 295, 298; 714/755, 756, 758, 790; 341/94

See application file for complete search history.

(56) References Cited

U.S. PATENT DOCUMENTS

| | | | |
|---|---|---|---|
| 5,414,738 A | 5/1995 | Bienz | |
| 5,438,590 A | 8/1995 | Tzukerman et al. | |
| 6,166,667 A * | 12/2000 | Park | 341/94 |
| 6,202,189 B1 * | 3/2001 | Hinedi et al. | 714/786 |
| 6,272,123 B1 * | 8/2001 | Abe | 370/342 |
| 6,651,210 B1 * | 11/2003 | Trott et al. | 714/758 |
| 2002/0166093 A1 * | 11/2002 | Eroz et al. | 714/755 |
| 2003/0118122 A1 * | 6/2003 | Nefedov | 375/265 |

FOREIGN PATENT DOCUMENTS

| | | |
|---|---|---|
| EP | 0 920 164 A2 | 6/1999 |
| EP | 0 980 148 A2 | 2/2000 |
| WO | 98/44638 | 10/1998 |
| WO | 98/48517 | 10/1998 |
| WO | 99/07076 | 2/1999 |

OTHER PUBLICATIONS

Benedetto: "Analysis, Design, and Iterative Decoding of Double Serially Concatenated Codes with Interleavers", IEEE, vol. 16 No. 2, Feb. 1998 pp. 231-244.

(Continued)

*Primary Examiner*—Don N. Vo
(74) *Attorney, Agent, or Firm*—Laurence A. Greenberg; Werner H. Stemer; Ralph E. Locher

(57) ABSTRACT

A method and a device for generating a rate compatible code are described. In the method, a serial-concatenated code at a code rate that can be predetermined is generated. A message signal is partially coded by a first coding stage. A second coding stage is provided on the output side of the first coding stage. The code rate of the coded message signal can be set in a manner which can be predetermined by a controllable puncturer which is disposed in the signal path between the first coding stage and the second coding stage.

13 Claims, 2 Drawing Sheets

OTHER PUBLICATIONS

Cygan et al.: "A Concatenated Two-Stace Adaptive (CTSA) Error Control Scheme for Data Transmission in Time-Varying Channels", IEEE, vol. 43 No. 2/3/4, 1995, pp. 795-803.

Matsuoka et al.: "Adaptive Modulation System with Variable Coding Rate Concatenated Code for High Quality Multi-Media Communication Systems", IEEE, 1996, pp. 487-491.

* cited by examiner

METHOD AND DEVICE FOR GENERATING A RATE COMPATIBLE CODE

CROSS-REFERENCE TO RELATED APPLICATION

This application is a continuation of copending International Application PCT/DE00/02302, filed Jul. 14, 2000, which designated the United States.

BACKGROUND OF THE INVENTION

Field of the Invention

The invention relates to a method and a device for generating a serial-concatenating code at a code rate that can be predetermined, for transmission of a message via a channel, in particular a radio channel.

The general purpose of channel coding is to match a message which is to be transmitted—possibly preprocessed in an upstream source coder—and its signal representation as optimally as possible to the characteristics of the transmission channel (radio channel). This includes, in particular, protection of the message against interference.

The message is protected against interference by including redundancy in the message to be transmitted, during the channel coding process. In this case, insertion of an excessive amount of redundancy is itself also in turn a disadvantage, since it results in only a very minor and imperceptible improvement for the user, but undesirably increases the frequency bandwidth required for the transmission of the message.

In future, third-generation mobile radio systems, concatenated (channel) codes will be used for data transmission via the air interface. In addition to parallel-concatenated codes, serial-concatenated codes, in particular convolution codes, are one of the possible candidates for such data transmission.

Furthermore, a wide range of services are offered in modern mobile radio systems. The services generally not only have different data transmission rates but also have different requirements with regard to the required transmission quality. Relatively high-rate services are generally provided by packet transmission in mobile radio systems. The required quality of service can be described by the maximum permissible bit error rate (for example $10^{-3}$ for voice and $10^{-6}$ for data services).

The article titled "Adaptive Modulation System with Variable Coding Rate Concatenated Code for High Quality Multi-Media Communication Systems", by Matsuoka et al., IEEE Vehicular Technologie Conference, New-York, Conf. 46, Apr. 28, 1996, pages 487 to 491, describes a method for producing a channel code, in which an outer RS code is serial-concatenated with an inner convolution code. The inner convolution code may in this case be punctured for rate control.

International Patent Disclosure WO 98/48517 describes a turbo coder. As this is a turbo coder of conventional configuration, a convolution-coded data stream and an interleaved convolution-coded data stream are generated. The two data streams can optionally be subjected to puncturing, in order to vary the signal rate.

SUMMARY OF THE INVENTION

It is accordingly an object of the invention to provide a method and a device for generating a rate compatible code which overcomes the above-mentioned disadvantages of the prior art devices of this general type, which allow messages to be transmitted flexibly, economically in terms of bandwidth and matched to the requirements of the services that are supported, when using serial-concatenated channel codes.

With the foregoing and other objects in view there is provided, in accordance with the invention, a method for generating a serial-concatenated code at a predetermined code rate for transmission of a message via a channel, including a radio channel. The method includes the steps of receiving a message signal to be coded, first coding of the message signal by a first coding stage, and second coding of the message signal by a second coding stage resulting in a coded message signal. The second coding stage is disposed on an output side of the first coding stage. A code rate of the coded message signal is set in a predetermined manner, using a controllable puncturer disposed in a signal path between the first and second coding stages. The coded message signal that has passed through both the first and second coding stages is then output.

The controllable puncturer which is integrated in the coding device allows the code rate to be set flexibly to a desired value. This allows data to be transmitted via the radio channel in a manner that conserves resources and is economic in terms of bandwidth. The code rate R is normally defined as the ratio k/n, where n is the number of data symbols which are produced at the output of the coding device in response to k data symbols being input into the coding device (by the addition of r redundant data symbols), that is to say n=k+r.

The controllable puncturer is disposed in the signal path between the two coding stages. The puncturer is then applied to an already partially coded message signal and, in addition to code rate control, also produces a (likewise controllable) change to the code generated by the coding device.

The method of operation of the puncturer is to eliminate individual data symbols (bits) from the data stream passing through the puncturer. The puncturer thus results in the code rate R being increased in comparison to the situation without a puncturer (or in comparison to the situation, which is within the scope of the invention, in which the puncturer is switched to "all-pass").

According to one preferred refinement of the invention, the puncturer is controlled as a function of the service to be transmitted. This makes it possible to ensure that a lower code rate (that is say more redundancy to be added) is used for services that require a low bit error rate (that is to say higher transmission quality).

A further preferred variant of the method according to the invention is characterized in that the puncturer is controlled as a function of an acknowledgement signal that is characteristic of the receiver response. In this case, the code rate R can be set in a control loop that includes the air interface. As soon as the receiver finds that a situation has occurred in which the reception quality is not adequate, it can report this to the (channel) coder in the transmitter via the acknowledgement signal, in response to which the transmitter reduces the code rate by reducing the puncturing frequency, and hence ensures that the transmission is more resistant to interference and that the reception at the receiver is characterized by a lower bit error rate.

A (maximum) code rate which is just sufficient to ensure a predetermined maximum bit error rate at the receiving end can be set by controlling the puncturer in the described manner. Operation such as this may also be referred to as code rate tuning.

The method according to the invention offers major advantages especially when the message signal to be transmitted is formed from data packets, that is to say packet-switching data transmission is provided. In this case, one particularly preferred method variant is characterized in that in the event of a packet not being transmitted completely and/or being transmitted with errors via the channel, repetition of the transmission of that data part of the packet which has not been received and/or has been received with errors is requested at the receiver end, and in that, in the second transmission which then takes place, only that data part which was not transmitted or was transmitted with errors is transmitted, with a lower code rate being set.

The generated code is preferably a turbo code, which advantageously results in that the iterative turbo decoding on the serial-concatenated code makes it possible to match the decoding complexity to the required system response (for example by choosing the number of iteration loops to be passed through).

One preferred refinement of the coding device according to the invention is characterized in that an interleaver is provided in the signal path between the two coding stages. The interleaver makes it possible to increase the Hamming separation in the generated code (that is to say the minimum separation between two code words), thus allowing more reliable and hence more error-tolerant decoding of the code in the receiver, that is to say a lower bit error rate can be achieved with the same redundancy.

In general, the coding stages can be formed both by block coders and by convolution coders, and it is also possible for one coding stage to be a convolution coder and the other coding stage to be a block coder. However, the coding stages are preferably in the form of two identical, recursive, systematic convolution coders.

In accordance with an added mode of the invention, there are the steps of setting up the first coding stage as a systematic convolution coder which outputs a systematic data sequence and a redundant data sequence; and puncturing the systematic data sequence and the redundant data sequence.

In accordance with a further mode of the invention, there is the step of forming the message signal from data packets in order to provide a packet-switching data transmission.

With the foregoing and other objects in view there is provided, in accordance with the invention, a device for coding a message signal that is to be transmitted via a channel, such as a radio channel. The device contains a first coding stage for receiving the message signal and subjecting the message signal to a first coding process, a second coding stage disposed in a signal path downstream from the first coding stage, and a controllable puncturer for setting a code rate of a coded message signal output from the device in a manner which can be predetermined. The controllable puncturer is disposed in the signal path between the first coding stage and the second coding stage.

In accordance with an added feature of the invention, the first coding stage and the second coding stage are convolution coders.

In accordance with another feature of the invention, at least the first coding stage is a recursive, systematic convolution coder with a first output for outputting a systematic data sequence and a second output for outputting a redundant data sequence. The controllable puncturer is one of two controllable puncturers including a first controllable puncturer connected to the first output and a second controllable puncturer connected to the second output.

In accordance with a concomitant device according to the invention, a further interleaver is disposed in the signal path after the second coding stage.

Other features which are considered as characteristic for the invention are set forth in the appended claims.

Although the invention is illustrated and described herein as embodied in a method and a device for generating a rate compatible code, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
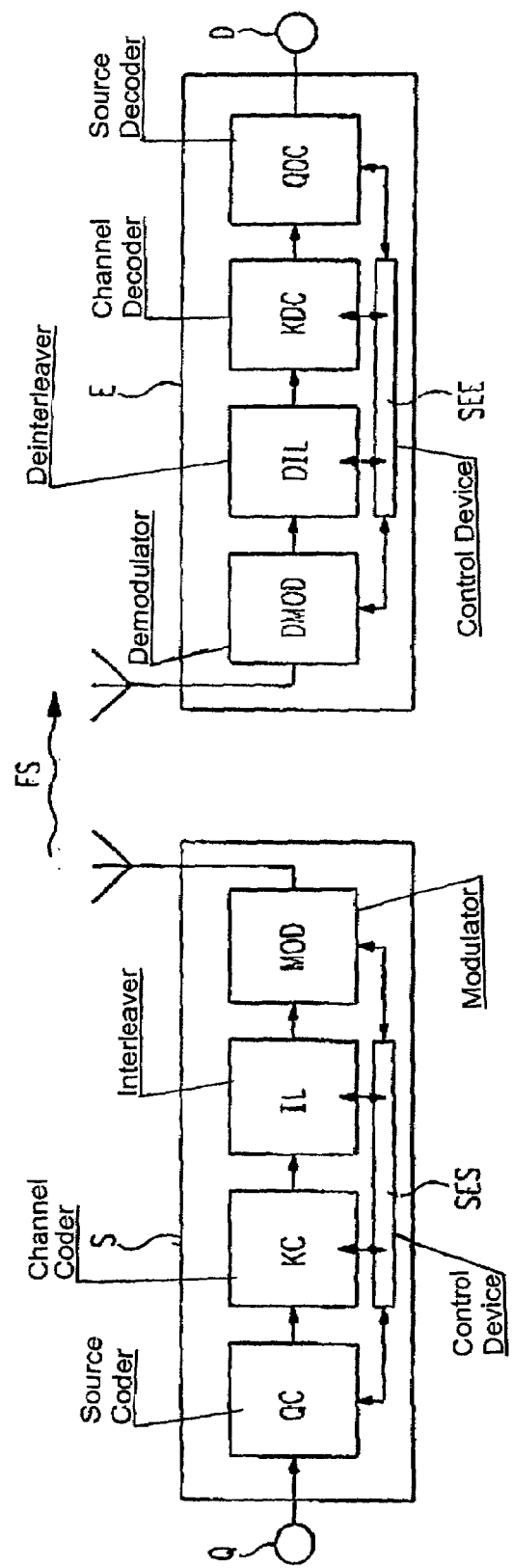
FIG. 1 is a block diagram illustrating an air interface in a mobile radio system with a transmitter and a receiver according to the invention.

Referring now to the figures of the drawing in detail and first, particularly, to FIG. 1 thereof, there is shown a transmitter S and a receiver E in a mobile radio system. The transmitter S and the receiver E can be associated with both a base station and a mobile station in, in particular, a cellular mobile radio system.

A message source Q, for example a microphone, camera etc., produces a message to be transmitted. The message to be transmitted may be either in the form of an analog signal (for example a voice, music or video signal) or else in the form of a digital signal (for example the memory contents of a digital voice, music or video memory). The message is then supplied to a source coder QC, with the message signal first being subjected to analog/digital conversion in the former case (analog message signal). The source coder QC converts the received digital message signal to a digital signal with less redundancy. It thus results in information compression or data compression, which allows the subsequent data processing and transmission to be carried out, in principle, at a lower data rate.

If packet-switching data transmission is provided, the message data is furthermore subdivided into individual data packets in the source coder QC.

A channel coder KC receives the source-coded message data and carries out channel coding, matched to the transmission channel, and adds an adjustable code rate R, in a manner that will be described in more detail later. An optional interleaver IL which is connected downstream from the channel coder KC is likewise intended to produce an improvement in the error protection for the received message. Interleaving of the channel-coded message signal to be transmitted, at the transmission end, improves the statistical independence of detection errors that occur during the decoding in the receiver, in a desirable manner.

The interleaver IL is followed by a modulator MOD which may contain, in a manner not illustrated in any more detail, a block former, an actual modulator stage, a transmission filter and a transmission amplifier. A radio-frequency radio signal FS which is output from the modulator MOD and is modulated onto a carrier is transmitted via the air interface and is received by the receiver E.

The received message signal is demodulated in a demodulator DMOD. The demodulator DMOD contains, in a manner that will not be described in any more detail, a reception amplifier, a reception filter, an analog-to-digital converter and an adaptive, coherent data detector.

The adaptive, coherent data detector carries out a detection process, which is matched to the instantaneous state of the transmission channel (air interface), on the transmitted message signal, taking account of the magnitude and phase of the reception field strength of the radio signal FS. At its output, the demodulator DMOD produces a data symbol sequence, which is a reconstruction of the data symbol sequence received from the modulator MOD at the transmission end.

The data symbol sequence output from the demodulator DMOD is changed to the correct sequence once again by a deinterleaver DIL (that is to say the data symbol interleaving produced by the interleaver IL is reversed), and this is passed to a channel decoder KDC.

The channel decoder KDC carries out a decoding process on the detected, coded data symbols in accordance with the channel code used in the coder KC. In order to assist the work of the channel decoder KDC, and to increase the number of detection errors that can be detected, the adaptive coherent data detector can generate reliability information for each detected data symbol, and can report the reliability information to the channel decoder (which is referred to as a "soft decision"). The channel decoder KDC generates a data signal whose data symbols are reconstructions of the data symbols received from the channel coder KC at the transmission end.

A data symbol is reconstructed either incorrectly or correctly. The bit error rate indicates the relative probability of incorrectly reconstructed data symbols.

The data symbols decoded by the channel decoder KDC are source-decoded in a source decoder QDC, are converted, if necessary, to an analog data signal, and are passed to a suitable message sink (loudspeaker, display etc.).

A control device SES provided in the transmitter S controls the data processing units QC, KC, IL, MOD and has a bi-directional data link to them, for this purpose. In an analogous manner, the data processing units DMOD, DIL, KDC, QDC disposed in the receiver E are controlled by a control device SEE in the receiver E.

The essential feature for the invention is that the channel coder KC generates a serial-concatenated code at an adjustable code rate R. The code rate R is set via the control device SES in the transmitter S, as will be explained in more detail in the following text.

Figure 2:
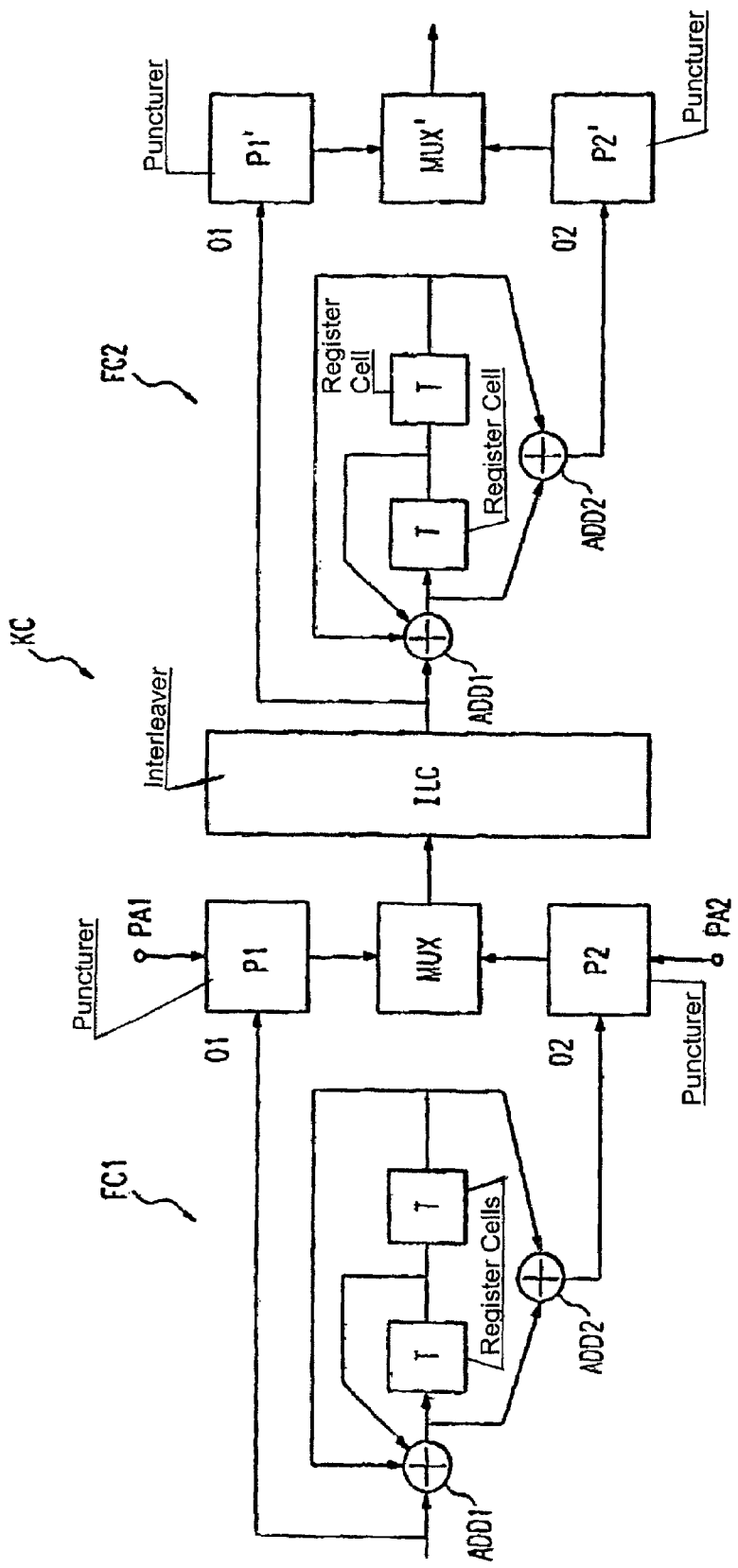
FIG. 2 is a block diagram of a coding device according to the invention for generating a channel-coded message signal in the transmitter.

FIG. 2 shows one specific exemplary embodiment of the channel coder KC shown in FIG. 1.

The channel coder KC has a first recursive systematic convolution coder FC1, a code rate increasing stage, which in this case is formed from two puncturers P1, P2 and a multiplexer MUX, an interleaver ILC which is connected downstream from the code rate increasing stage P1/P2/MUX, a second recursive, systematic convolution coder FC2, and a further (optional) code rate increasing stage. A second code rate increasing stage may be configured to be physically identical to the first code rate increasing stage, that is to say likewise containing two puncturers P1', P2' and a multiplexer MUX'.

On the input side, each convolution coder FC1, FC2 has a first adder ADD1 and a shift register, which is connected downstream from the adder ADD1 and has two cells T. The convolution coders FC1, FC2 each have a first output O1, at which a data symbol sequence is produced whose elements (data symbols) are identical to the originally received data symbols. Coders with this characteristic are referred to as systematic coders. The convolution coders FC1 and FC2 produce a redundant data symbol sequence, which is formed by a second adder ADD2, at a second output O2. Obviously, a redundant data symbol (redundant bit) which is produced at the second output O2 at a specific time is dependent on the input bit and the preceding data symbols stored in the two cells. The convolution coders FC1, FC2 thus have a reversion depth.

Since one, and only one, redundant data symbol is produced per input data symbol, the code rate of the first convolution coder FC1 as well as the code rate of the second convolution coder FC2 are both 0.5.

The puncturer P1 receives the systematic (that is to say unchanged) data symbol sequence produced at the output O1. The redundant data symbol sequence produced at the output O2 of the first convolution coder FC1 is passed to the second puncturer P2. At least one of the two puncturers P1, P2, but in general both, has or have a control input. The control input is used to send a puncturing instruction PA1 or PA2, respectively, which is output from the control device SES, to the respective puncturer P1 or P2. The respective puncturing instruction PA1 or PA2 in each case indicates a puncturing pattern, in accordance with which the systematic or redundant data symbol sequence passing through the respective puncturer must be punctured.

By way of example, the puncturing pattern may be "xx0xx0xx0xx0 . . . ". In this case, x stands for "puncture" and 0 stands for "do not puncture". Accordingly, in the case of such a puncturing instruction PA1 or PA2, two data symbols are always punctured, that is to say they are eliminated from the data sequence, and one is passed on.

The data symbols which are passed on from the puncturers P1, P2 and are multiplexed in the multiplexer MUX are passed on to the second convolution coder FC2 after block-by-block or convolution interleaving in the manner already described in the interleaver ILO, where they are further-processed, that is to say "completely coded"—in the present example in the same way as in the first convolution coder FC1. The puncturers P1', P2' may be controllable in the same way as the puncturers P1, P2; however, they may also operate with a fixed puncturing pattern or else be completely omitted, in which case the latter option corresponds to the puncturing pattern "0000000 . . . ". The coded message signal is produced at the output of the multiplexer MUX'.

The minimum code rate R that can be produced by the channel coder KC (corresponding to maximum redundancy) is ¼. The systematic, recursive convolution coders FC1, FC2 illustrated in FIG. 2 and having a reversion depth 3 can be described by code polynomials 7 and 5 using octal notation. The driving of the puncturers P1 and/or P2 and, if appropriate P1' and/or P2' according to the invention makes it possible to vary the code rate in a desirable manner.

The variation of the code rate allows rate compatibility and bit error tuning.

In the case of packet transmission, it is possible, for example, to support the hybrid Type 2 method referred to as automatic repeat request. A method such as this is distinguished in that, if a data packet is transmitted with errors, the receiver requests that only a part of the data packet will be repeated, rather than the entire data packet (while the correctly transmitted part is buffer-stored in the receiver). In this case, the invention allows the second transmission to be carried out at a reduced code rate R, hence making it possible to considerably improve the probability of error-free transmission of the remaining data part at the second attempt. The latter is important in order to make it possible to ensure transmission with a real-time capability.

In principle, the method according to the invention and the coding device according to the invention make it possible to generate all the codes associated with a group of serial-concatenated codes. This includes all the possible combinations of concatenations, for example convolution code with convolution code (this also includes turbo codes), convolution code with block code, or block code with block code. Examples of block codes are a QR (Quadratic Remainder) code and a RS (Reed Solomon) code. The code rate R can be set either as a function of transmission-end parameters (for example code choice, transmission power, desired service etc.) or as a function of reception-end parameters (reception power, bit error rate etc.)—possibly reported to the transmitter in the form of feedback. By way of example, the receiver E can use a simple parity check to confirm that a received data block has been transmitted with errors, or can calculate the variance of the reliability information associated with the received data symbols in order to estimate the bit error rate. An acknowledgement can be sent to the transmitter, in order to increase or reduce the code rate R, as a function of the result of the parity check and/or the estimated bit error rate.

The channel coder KC according to the invention may also be formed from more than two coding stages FC1, FC2 connected in series with one another, and it is also possible to provide a configuration in the form of a cascade, containing alternately disposed coding stages and controllable code rate increasing stages.

We claim:

1. A method for generating a serial-concatenated channel-code at a predetermined code rate for transmission of a message via a channel, including a radio channel, which comprises the steps of:
   receiving a message signal to be coded;
   first channel-coding of the message signal by a first channel-coding stage, the first channel-coding stage being a systematic convolution coder outputting the message signal to include a systematic data sequence and a redundant data sequence;
   puncturing the systematic data sequence and the redundant data sequence;
   second channel-coding of the message signal by a second channel-coding stage resulting in a channel-coded message signal, the second channel-coding stage disposed on an output side of the first channel-coding stage;
   setting a code rate of the channel-coded message signal in a predetermined manner, using a controllable puncturer disposed in a signal path between the first and second channel-coding stages; and
   outputting the channel-coded message signal which has passed through both the first and second channel-coding stages.

2. The method according to claim 1, which comprises controlling the controllable puncturer in dependence on a service to be transmitted.

3. The method according to claim 1, which comprises controlling the controllable puncturer in dependence on an acknowledgement signal that is characteristic of a receiver response.

4. The method according to claim 3, which comprises controlling the controllable puncturer to set the code rate to be just sufficient to ensure a maximum predetermined bit error rate at a receiving end.

5. The method according to claim 1, which comprises forming the message signal from data packets in order to provide a packet-switching data transmission.

6. The method according to claim 5, which comprises:
   requesting in a receiver end, a further transmission of that data part of a packet which has not been received in an event of the packet not being transmitted completely via the channel; and
   during the further transmission, only the data part which was not transmitted is transmitted, with a lower code rate being set.

7. The method according to claim 5, which comprises:
   requesting in a receiver end, a further transmission of that data part of a packet that has been received with errors in an event of the packet being transmitted with errors via the channel; and
   during the further transmission, only the data part transmitted with errors is transmitted, with a lower code rate being set.

8. The method according to claim 1, which comprises generating the channel-coded message signal using a turbo code.

9. A device for channel-coding a message signal that is to be transmitted via a channel, including a radio channel, the device comprising:
   a first channel-coding stage for receiving the message signal and subjecting the message signal to a first coding process, said first channel-coding stage having a systematic convolution coder outputting the message signal to include a systematic data sequence and a redundant data sequence;
   a second channel-coding stage disposed in a signal path downstream from said first channel-coding stage; and
   a controllable puncturer for setting a code rate of a channel-coded message signal output from the device in a manner being predetermined, said controllable puncturer disposed in said signal path between said first channel-coding stage and said second channel-coding stage, said controllable puncturer puncturing the systematic data sequence and the redundant data sequence.

10. The device according to claim 9, wherein said second channel-coding stage is a convolution coder.

11. The device according to claim 9, wherein:
    at least said first channel-coding stage is a recursive, systematic convolution coder with a first output for outputting the systematic data sequence and a second output for outputting the redundant data sequence; and
    said controllable puncturer is one of two controllable puncturers including a first controllable puncturer connected to said first output and a second controllable puncturer connected to said second output.

12. The device according to claim 9, including an interleaver disposed in said signal path between said first channel-coding stage and said second channel-coding stage.

13. The device according to claim 12, including a further interleaver disposed in said signal path after said second channel-coding stage.

* * * * *